US012647522B2

(12) United States Patent
Ishimura

(10) Patent No.: US 12,647,522 B2
(45) Date of Patent: Jun. 2, 2026

(54) INFORMATION PROCESSING APPARATUS, SIMULATION SYSTEM, NON-TRANSITORY COMPUTER READABLE MEDIUM, AND INFORMATION PROCESSING METHOD

(71) Applicant: FUJIFILM Business Innovation Corp., Tokyo (JP)

(72) Inventor: Takanari Ishimura, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/177,160

(22) Filed: Mar. 2, 2023

(65) Prior Publication Data
US 2024/0089378 A1 Mar. 14, 2024

(30) Foreign Application Priority Data
Sep. 13, 2022 (JP) ................................. 2022-145299

(51) Int. Cl.
*H04N 1/00* (2006.01)
(52) U.S. Cl.
CPC ..... *H04N 1/00031* (2013.01); *H04N 1/00015* (2013.01)
(58) Field of Classification Search
USPC ........................................................ 358/1.13
See application file for complete search history.

(56) References Cited

U.S. PATENT DOCUMENTS

| 10,650,291 | B2 | 5/2020 | Ito et al. | |
| 2019/0109960 | A1* | 4/2019 | Ito | H04N 1/00244 |
| 2019/0114185 | A1* | 4/2019 | Nakajima | G06F 3/124 |

FOREIGN PATENT DOCUMENTS

| JP | 2014-032503 A | 2/2014 |
| JP | 2018-173703 A | 11/2018 |
| JP | 2019-071024 A | 5/2019 |

OTHER PUBLICATIONS

Apr. 14 2026 Office Action issued in Japanese Patent Application No. 2022-145299.

* cited by examiner

*Primary Examiner* — Jacky X Zheng
(74) *Attorney, Agent, or Firm* — OLIFF PLC

(57) ABSTRACT
An information processing apparatus reproduces a malfunction occurring in a different information processing apparatus, the malfunction being reproduced outside an environment where the different information processing apparatus is installed. The information processing apparatus includes a processor configured to: in response to occurrence of a malfunction in the different information processing apparatus, acquire apparatus state information from the different information processing apparatus, the apparatus state information being used for malfunction analysis; and with reference to the acquired apparatus state information, create an operating environment in a system provided outside the environment where the different information processing apparatus is installed, the operating environment being equivalent to an operating environment of the different information processing apparatus.

7 Claims, 3 Drawing Sheets

INFORMATION PROCESSING APPARATUS, SIMULATION SYSTEM, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-145299 filed Sep. 13, 2022.

BACKGROUND

(i) Technical Field

The present disclosure relates to an information processing apparatus, a simulation system, a non-transitory computer readable medium, and an information processing method.

(ii) Related Art

Recently, there is known technology for providing cloud services in cooperation between a multifunction printer that is a real machine and a virtual device corresponding to the multifunction printer in the cloud site. Even if a user does not directly access the multifunction printer, but if the user accesses the virtual device in the cloud site, the user may use a service such as image processing provided by the multifunction printer.

In some cases, the multifunction printer that is a real machine has a malfunction and also fails to exert expected performance. In these cases, an operating environment is improved by analyzing the state of the multifunction printer on occasions. However, it is sometimes difficult, for an implementation reason or the like, to reproduce the operating environment in the multifunction printer at the time of the malfunction occurrence.

Hence, technology has been proposed by which the issue of the real machine is enabled to be improved in such a manner that the malfunction of the real machine is reproduced on the virtual device (for example, Japanese Unexamined Patent Application Publication No. 2019-071024).

SUMMARY

There is a case where an information processing apparatus is intended to be used to reproduce a malfunction having occurred in a different information processing apparatus without using the different information processing apparatus to reproduce the malfunction. The information processing apparatus is installed outside an environment where the different information processing apparatus is installed.

However, if the information processing apparatus outside the installation environment of the different information processing apparatus is used alone, it is possible that the malfunction having occurred in the different information processing apparatus is not successfully reproduced in the operating environment equivalent to the operating environment at the time of the occurrence of the malfunction in the different information processing apparatus.

Aspects of non-limiting embodiments of the present disclosure relate to improving the degree of malfunction reproducibility of an information processing apparatus installed outside an environment where a different information processing apparatus having a malfunction, as compared with a case where the information processing apparatus is used alone for the malfunction reproduction.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus that reproduces a malfunction occurring in a different information processing apparatus, the malfunction being reproduced outside an environment where the different information processing apparatus is installed, the information processing apparatus including a processor configured to: in response to occurrence of a malfunction in the different information processing apparatus, acquire apparatus state information from the different information processing apparatus, the apparatus state information being used for malfunction analysis; and with reference to the acquired apparatus state information, create an operating environment in a system provided outside the environment where the different information processing apparatus is installed, the operating environment being equivalent to an operating environment of the different information processing apparatus.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments of the present disclosure will be described on the basis of the drawings.

Exemplary Embodiment 1

Figure 1:
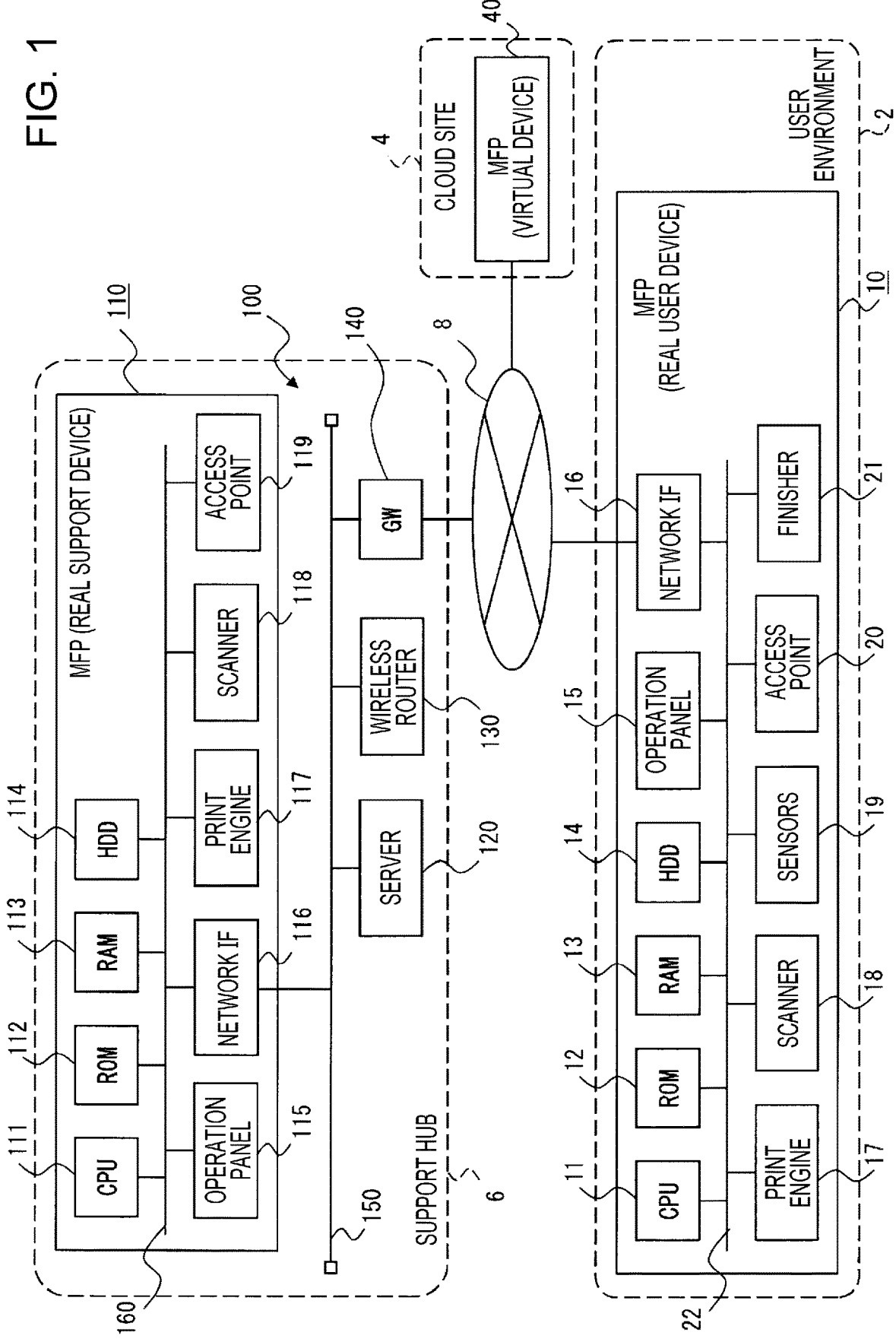
FIG. 1 is a diagram of the overall configuration of a simulation system in Exemplary Embodiment 1.

FIG. 1 is a diagram of the overall configuration of a simulation system in this exemplary embodiment. FIG. 1 illustrates a multifunction printer (MFP) 10 installed in a user environment 2, a MFP 40 formed in a cloud site 4, and a service system 100 installed in a support hub 6. The MFPs 10 and 40 and the service system 100 are connected to a network 8 such as the Internet. At least the MFP 10 and the MFP 40 and at least the MFP 40 and the service system 100 are capable of communicating with each other via the network 8.

The user environment 2 is a use environment for a user who uses the MFP 10 that is a real machine. Various apparatuses in addition to the MFP 10 may be installed in the user environment 2. One or more apparatuses installed therein are omitted in FIG. 1 but are explicitly described as occasion demands. The MFP 10 is a real machine physically installed in the user environment 2 and thus is also referred to as a real user device 10 on occasions in the following description.

The MFP 10 is one of the forms of an image forming apparatus having various functions such as a printing function, a copying function, and a scanning function and has a computer built therein. The MFP 10 includes a CPU 11, a ROM 12, a RAM 13, a hard disk drive (HDD) 14 serving as a memory storing image data, a confidential box, and the like, an operation panel 15 serving as a user interface, a network interface (IF) 16 for connecting to the network 8, a print engine 17, a scanner 18, and sensors 19. The sensors 19 include a measurement unit for collecting sensor data indicating the situation of the internal and ambient environments of an apparatus, such as sound volume, temperature, humidity, an apparatus angle, and sheet transportation. The MFP 10 in this exemplary embodiment also includes an access point 20 and a finisher 21 in addition to the aforementioned device configuration. In the access point 20, wireless communication with a wireless communication apparatus in the user environment 2 is performed by using a Wi-Fi (registered trademark) communication method. The finisher 21 is taken as an example of an optional device (hereinafter, also referred to as an additional device) provided in addition to devices mainly configuring the MFP 10. It goes without saying that a different additional device may also be connected. These components 11 to 21 are connected to an internal bus 22. The MFP 10 in this exemplary embodiment does not have a hardware configuration feature.

The MFP 40 is one of the forms of a virtual image forming apparatus implemented by one or more computers and applies to an information processing apparatus according to the present disclosure that has a function of reproducing a malfunction occurring in the MFP 10, the malfunction being reproduced outside the user environment 2 where the MFP 10 is installed. The MFP 40 is an MFP virtually formed in the cloud site 4 and thus is also referred to as a virtual device 40 on occasions in the following description. The MFP 40 virtually has a hardware configuration equivalent to that of the MFP 10, but this is omitted in FIG. 1.

To provide equivalent services to the user from the real user device 10 and the virtual device 40, data is synchronized between the real user device 10 and the virtual device 40. The term "synchronizing data" denotes basically mutually holding the same data. In addition, part of software (referred to as a subset) present in the virtual device 40 is also present in the MFP 10 on occasions. As described above, the term "synchronizing data" is not construed definitely as mutually holding completely the same data. In this exemplary embodiment, the term "synchronizing data" denotes creating a state where a service to be provided by using data may be provided, the state being created by the MFPs 10 and 40 in cooperation with each other.

The data includes an application, data used by the application, various set values for the MFPs 10 and 40, and the like. That is, in this exemplary embodiment, electronic data referred to when the MFPs 10 and 40 operate is collectively referred to as data. If data is an application, synchronization is required in response to upgrading the application, adding a function, or the like.

The support hub 6 is a facility for supporting the user of the MFP 10. The service system 100 is a computer system physically established in the support hub 6 and outside the user environment 2 where the MFP 10 is installed. The service system 100 includes a MFP 110, a server 120, a wireless router 130, and a gateway (GW) 140 that are connected to a local area network (LAN) 150.

The MFP 110 applies to an information processing apparatus for reproducing the malfunction installed in the service system 100 outside the user environment 2 and is used to support the user. The MFP 110 is a real machine physically installed in the support hub 6 and thus is also referred to as a real support device 110 on occasions in the following description.

The MFP 110 is one of the forms of an image forming apparatus having various functions such as the printing function, the copying function, and the scanning function and is an apparatus having a computer built therein. The MFP 110 includes a CPU 111, a ROM 112, a RAM 113, a HDD 114 serving as a memory storing image data, a confidential box, and the like, an operation panel 115 serving as a user interface, a network IF 116 for connecting to the network 8, a print engine 117, a scanner 118, and an access point 119. If there are multiple user environments 2, it is difficult to configure the hardware of the MFP 110 to support all of the MFPs 10 installed in the user environments 2. Although the MFP 110 is a MFP for supporting users and thus is equipped with major components, an additional device equivalent to additional devices of the MFPs 10 used by the users is not necessarily connected to the MFP 110. In this exemplary embodiment, an additional device is not connected to an internal bus 160 of the MFP 110 as illustrated in FIG. 1.

The server 120 and the wireless router 130 operate in cooperation with the MFP 110 at the time of executing the simulation. The gateway 140 is a network connection unit for connecting the network 8.

Figure 2:
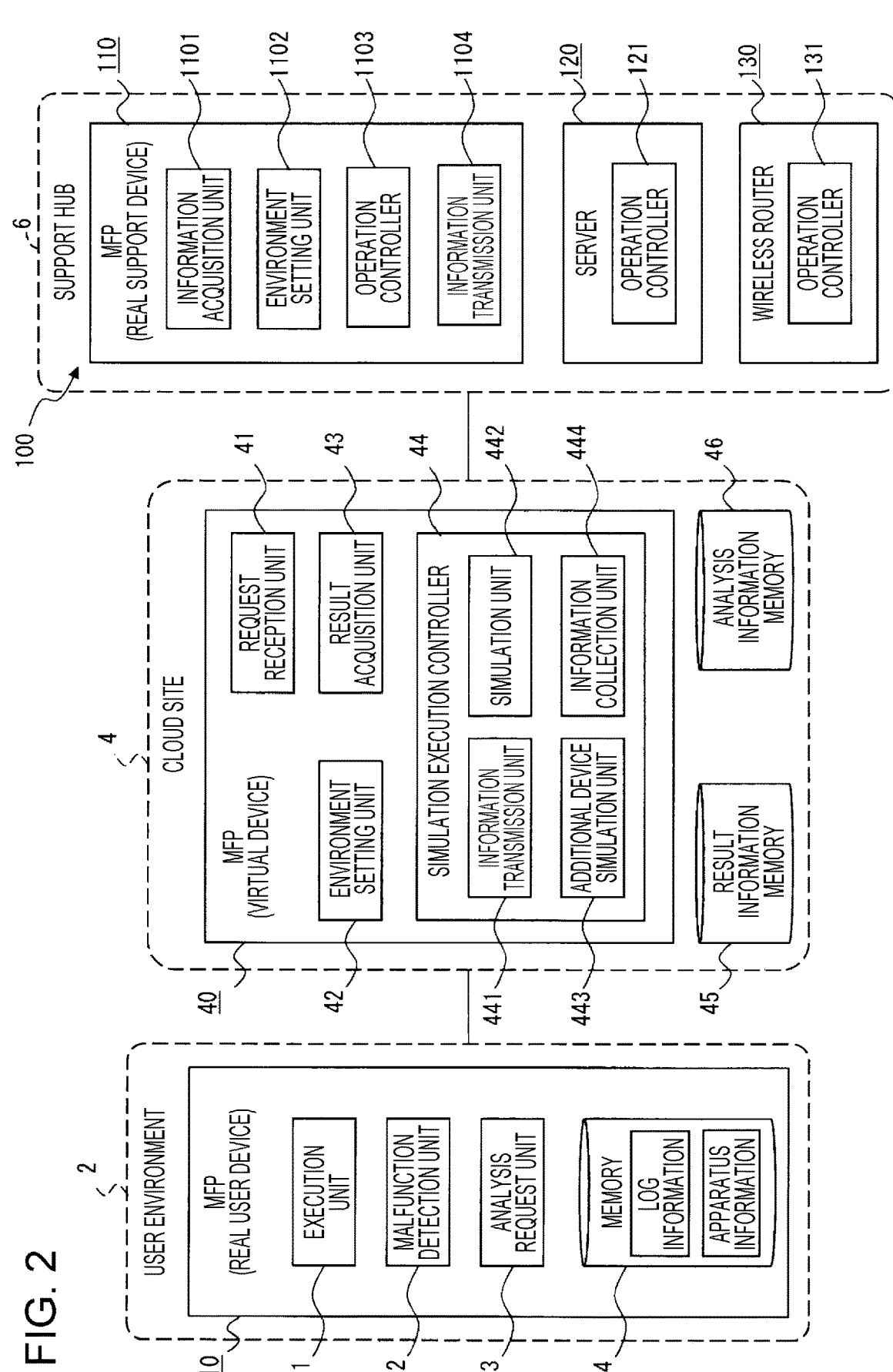
FIG. 2 is a block diagram of the configuration of the simulation system in Exemplary Embodiment 1.

FIG. 2 is a block diagram of the configuration of the simulation system in this exemplary embodiment. FIG. 2 illustrates functional blocks of the real user device 10 illustrated in FIG. 1, the virtual device 40, and the real support device 110. Components not used for the explanation of this exemplary embodiment including basic functions such as the scanning and copying of, for example, the MFPs 10, 40, and 110 are omitted in FIG. 2.

The real user device 10 has an execution unit 31, a malfunction detection unit 32, an analysis request unit 33, and a memory 34. The execution unit 31 runs various programs to cause the real user device 10 to operate. Log information regarding a predetermined event occurring while the real user device 10 is operating is generated and accumulated. For example, log information is recorded in the system log in response to the occurrence of a system error and is recorded in the communication log in response to the occurrence of a communication error. The malfunction detection unit 32 analyzes various pieces of log information at all times while the real user device 10 is operating and thereby determines whether an event meets a predetermined malfunction condition. That is, the malfunction detection unit 32 detects a malfunction having occurred in the real user device 10. If the occurrence situation of the malfunction detected by the malfunction detection unit 32 meets a predetermined analysis request condition, the analysis request unit 33 requests the virtual device 40 to analyze the malfunction having occurred in the real user device 10, that is, to execute simulation.

The memory 34 stores various pieces of log information and apparatus information as information required to execute the simulation (described later), that is, as apparatus state information used for the malfunction analysis. For example, the various pieces of log information include: logs such as a system log regarding the real user device 10, an execution log regarding a job, and a log such as a communication log; and result data indicating a situation and a state at the time when the real user device 10 operates, such as sensor data collected by the sensors 19. The apparatus information is information set and registered in advance in the memory 34 and includes information depending on the real user device 10 such as apparatus configuration information of the real user device 10 and specification information regarding the performance thereof, and system setting information.

The components 31 to 33 of the real user device 10 are implemented by cooperative operation between a computer included in the real user device 10 and a program run by the CPU 11 included in the computer. The memory 34 is implemented by the HDD 14 included in the real user device 10. Alternatively, the RAM 13 or an external memory may be used via a network.

The virtual device 40 has a request reception unit 41, an environment setting unit 42, a result acquisition unit 43, a simulation execution controller 44, a result information memory 45, and an analysis information memory 46. The request reception unit 41 receives a malfunction analysis request from the real user device 10. The environment setting unit 42 sets, in the virtual device 40, an operating environment of the real user device 10 on the basis of information acquired when the request reception unit 41 receives the analysis request. With reference to the result information memory 45, the result acquisition unit 43 verifies past occurrence of a malfunction in the operating environment formed at present by using the virtual device 40. The simulation execution controller 44 controls the execution of the simulation in cooperative operation with the service system 100.

The simulation execution controller 44 includes an information transmission unit 441, a simulation unit 442, an additional device simulation unit 443, and an information collection unit 444. The information transmission unit 441 transmits, to the real support device 110, apparatus information acquired from the real user device 10. The simulation unit 442 executes the simulation. When the simulation is executed, the additional device simulation unit 443 executes the simulation particularly for the additional device. The information collection unit 444 collects information collected at the time of executing the simulation, from the real support device 110.

The result information is accumulated in the result information memory 45. In the result information, an occurring malfunction, information indicating the operating environment of the real user device 10 at the occurrence of the malfunction, and solution information are stored in association with each other. The solution information includes a solution by which how the malfunction has been coped with to remove the occurrence of the malfunction.

The information collected from the real support device 110 by the information collection unit 444 by executing the simulation is stored as malfunction analysis information in the analysis information memory 46.

The components 41 to 44 of the virtual device 40 are implemented by cooperative operation between a computer included in the virtual device 40 and a program run by the CPU included in the computer. The memories 45 and 46 are implemented by a HDD included in the virtual device 40. Alternatively, a RAM or an external memory may be used via a network.

The real support device 110 has an information acquisition unit 1101, an environment setting unit 1102, an operation controller 1103, and an information transmission unit 1104. The information acquisition unit 1101 acquires the apparatus information transmitted from the virtual device 40. The environment setting unit 1102 sets, in the real support device 110, an operating environment equivalent to that of the real user device 10 on the basis of the apparatus information acquired by the information acquisition unit

1101. The operation controller 1103 controls the operation of the real support device 110 in accordance with the instruction from the virtual device 40 at the time of executing the simulation. The information transmission unit 1104 transmits, to the virtual device 40, the information collected at the time of executing the simulation.

The components 1101 to 1104 of the real support device 110 are implemented by cooperative operation between a computer included in the real support device 110 and a program run by the CPU 111 included in the computer.

The server 120 has an operation controller 121 that controls the operation of the server 120 in accordance with the instruction from the virtual device 40 at the time of executing the simulation. The wireless router 130 has an operation controller 131 that controls the operation of the wireless router 130 in accordance with the instruction from the virtual device 40 at the time of executing the simulation. The operation controller 121 is implemented by cooperative operation between a computer included in the server 120 and a program run by the CPU included in the computer. The operation controller 131 is implemented by cooperative operation between a computer included in the wireless router 130 and a program run by the CPU included in the computer.

The programs used in this exemplary embodiment may be provided not only by using a communication medium but also in such a manner as to be stored in the computer readable recording medium such as a USB memory. The programs provided from the communication medium or the recording medium are installed on the computer and serially run by the CPU of the computer, and thereby various processes are implemented.

Operations in this exemplary embodiment will then be described.

First, in the real user device 10, simulation mode is enabled by the user manually or by the real user device 10 automatically (step S101). The simulation mode will be described later.

While being operating, the real user device 10 collects various pieces of log information including pieces of sensor data and accumulates the pieces of log information in the memory 34 (step S102). If the MFP 10 detects a malfunction due to the occurrence of an event, such as any of the pieces of sensor data exceeding a predetermined threshold, while the MFP 10 is being operating, the malfunction detection unit 32 records the state of the real user device 10 at the time of the detection in the log information. If the occurring malfunction meets the predetermined analysis request condition, the analysis request unit 33 requests the virtual device 40 to analyze the malfunction (step S103). The analysis request condition is a condition triggering a request to the virtual device 40 for the malfunction analysis, and, for example, the condition specifies the number of times the malfunction detection unit 32 detects a malfunction exceeds a predetermined upper limit value in a predetermined period. The log information to be collected and a method for detecting a malfunction by the malfunction detection unit 32 may be the same as in the related art. Any timing may be set as timing for requesting the analysis from the virtual device 40 in accordance with the setting of the analysis request condition.

When requesting the analysis from the virtual device 40, the analysis request unit 33 transmits information required to execute the simulation such as the apparatus information stored in the memory 34, various pieces of log information collected from time at least before the malfunction detection until analysis request, and information loaded in the system area of the RAM 13.

When receiving a malfunction analysis request from the real user device 10, the request reception unit 41 of the virtual device 40 receives various pieces of log information or the like transmitted together with the request and thereby acquires the pieces of log information (step S401). The virtual device 40 synchronizes data with the real user device 10 and thus provides the user with a service in the same manner as that by the real user device 10. In response to receiving the analysis request, the virtual device 40 starts operations as a simulator for the real user device 10. For this purpose, the environment setting unit 42 creates, in the virtual device 40, the operating environment equivalent to that of the real user device 10, for example, in such a manner as to load, in the RAM 113, the information acquired from the real user device 10, such as the information in the RAM 13 (step S402).

Subsequently, with reference to the result information memory 45, the result acquisition unit 43 verifies past occurrence of a malfunction in the operating environment formed at present by using the virtual device 40 or in the operating environment similar to the formed operating environment. If there is result information regarding the malfunction having occurred in the operating environment, the virtual device 40 acquires the result information from the result information memory 45 without executing the simulation and acquires a solution to the malfunction occurrence from the result information (step S403). For example, the acquired solution may be given to the real user device 10 as feedback to improve the operating environment of the real user device 10.

The simulation mode is now described.

The virtual device 40 executes the simulation in cooperation with the service system 100. The virtual device 40 synchronizes data with the real user device 10 and thus is considered to apply to a device installed outside the environment where the real user device 10 is installed, the device being allowed to acquire the various pieces of log information or the like in the real user device 10 without harm from the security viewpoint. In contrast, the support hub 6 is not necessarily trusted by the user, unlike the virtual device 40. Hence, in this exemplary embodiment, the real user device 10 is configured to explicitly enable or disable the simulation mode. If the simulation mode is enabled, the virtual device 40 is allowed to execute the simulation as a feature of this exemplary embodiment in cooperation with the service system 100. If the simulation mode is disabled, the virtual device 40 executes the simulation alone without cooperating with the service system 100. The simulation mode may be set in the real user device 10 by the virtual device 40.

Since this exemplary embodiment is described on the assumption that the simulation mode is enabled, the virtual device 40 executes the simulation in cooperation with the service system 100. The information transmission unit 441 of the simulation execution controller 44 thus transmits, to the real support device 110, the apparatus information acquired from the real user device 10 (step S404).

The information acquisition unit 1101 of the real support device 110 acquires the apparatus information transmitted from the virtual device 40 (step S601). The environment setting unit 1102 then sets the operating environment of the real support device 110 on the basis of the acquired apparatus information and thereby creates, in the real support device 110, an operating environment equivalent to that of the real user device 10 (step S602). The real support device 110 thereby achieves the mirroring of the real user device 10, and thus the simulation unit 442 of the simulation execution controller 44 of the virtual device 40 executes the simulation in cooperation with the real support device 110, not with the real user device 10.

However, the real support device 110 does not necessarily have completely the same hardware configuration as that of the real user device 10. For example, as illustrated in FIG. 1, the real user device 10 includes the finisher 21 as an additional device, but the real support device 110 does not include a finisher. As described above, if it is not possible for the real support device 110 in the service system 100 to configure a device equivalent to the real user device 10, the virtual device 40 is configured for the not configured part to enable the malfunction to be reproduced in the virtual device 40. That is, in this case, the additional device simulation unit 443 starts the simulator supporting the additional device of the real user device 10 (step S405) and reproduces the malfunction in such a manner as to link the environment for the reproduction created in the virtual device 40 to the environment for reproduction in the service system 100.

The simulation unit 442 and the additional device simulation unit 443 thereby cause the real support device 110 to operate, for example, in such a manner as to change job transmission timing, whether to perform printing or scanning, a size for printing or scanning, or the like, with reference to the various pieces of log information acquired from the real user device 10 to enable information useful for the malfunction analysis to be collected. The simulation execution controller 44 controls the execution of the simulation in this manner (step S406).

The operation controller 1103 of the real support device 110 controls the operation of the real support device 110 in accordance with the control of the execution of the simulation in the virtual device 40. For example, the operation controller 1103 causes the real support device 110 to operate, for example, in such a manner as to execute a job or change a parameter in accordance with the data transmitted from the virtual device 40. The operation controller 1103 collects and stores various pieces of log information as results of the operation of the real support device 110 (step S603).

After the end of the simulation, the information transmission unit 1104 transmits, to the virtual device 40, the various pieces of log information collected at the time of executing the simulation (step S604).

In the virtual device 40, the information collection unit 444 of the simulation execution controller 44 collects and stores the information transmitted from the real support device 110 as the results of the execution of the simulation (step S407).

The information acquired from the simulation described above is used, for example, to find the cause of the malfunction occurrence by being analyzed and to help in fixing a program bug. Before reflecting the fixed program onto the real user device 10, the program may be validated by causing the real support device 110 to run the fixed program.

According to this exemplary embodiment, even if it is not possible to use the real user device 10 for the execution of the simulation, the operating environment equivalent to that of the real user device 10 is created in the different real machine, that is, the real support device 110 installed in the support hub 6 to thereby enable the simulation to be executed. In this exemplary embodiment, not the virtually formed MFP 40 but the MFP 110 that is a real machine is used, and thus the operating environment closer to that of the MFP 10 that is a real machine is created easily. The cooperation between the virtual device 40 and the real support device 110 thereby enables the degree of reproducibility of the malfunction occurring in the real user device 10 to be improved, as compared with the case where the virtual device 40 alone executes the simulation.

Exemplary Embodiment 2

Exemplary Embodiment 1 assumes that the real user device 10 operates alone. However, the real user device 10 has a malfunction due to cooperation with a different apparatus on occasions. Hence, this exemplary embodiment addresses the occurrence of the malfunction due to the cooperation with the different apparatus.

Figure 3:
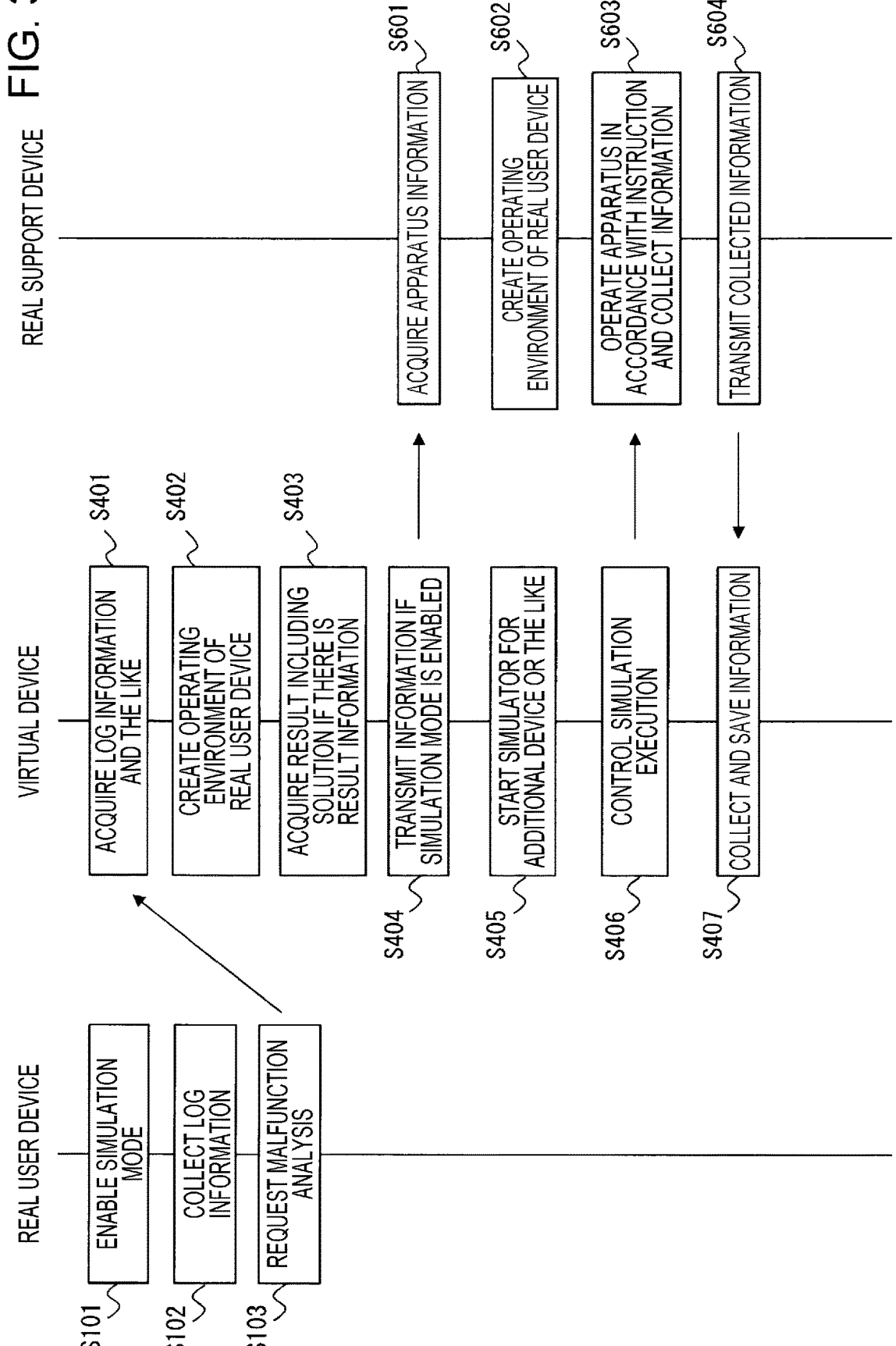
FIG. 3 is a sequence diagram at the time of executing simulation in Exemplary Embodiment 1.

The system configuration and the block configuration in this exemplary embodiment may be the same as those in Exemplary Embodiment 1 illustrated in FIGS. 1 and 2. The operation sequence may also be the same as that in Exemplary Embodiment 1 illustrated in FIG. 3. However, this embodiment is different from Exemplary Embodiment 1 in that the target of the cooperative operation at the time of the simulation in the virtual device 40 is not limited to the real support device 110. Hereinafter, operations in this exemplary embodiment will be described by using the sequence diagram illustrated in FIG. 3. Explanation of the same steps as those in Exemplary Embodiment 1 is appropriately omitted.

In this exemplary embodiment, like Exemplary Embodiment 1, the real user device 10 also collects the various pieces of log information including the sensor data while being operating and accumulates the pieces of information in the memory 34 (step S102). If the malfunction detection unit 32 detects a malfunction, such as any of the pieces of sensor data exceeding the predetermined threshold, while the MFP 10 is being operating, the malfunction detection unit 32 records, in the log information, the state of the real user device 10 at the time of the detection. In this exemplary embodiment, for example, the occurrence of the following is recorded as the log information: a retry error in the real user device 10 in wired communication with a server (not illustrated); or an event that a reception sensitivity at the access point 20 falls below a predetermined threshold during Wi-Fi connection with a wireless communication apparatus (not illustrated), for example, a smartphone. If the occurring malfunction meets the predetermined analysis request condition, the analysis request unit 33 requests the malfunction analysis from the virtual device 40 (step S103). The virtual device 40 causes the real support device 110 to create the operating environment of the real user device 10 in the same manner as in Exemplary Embodiment 1 (steps S401 to S405) and controls the execution of the simulation (step S406).

However, the simulation execution controller 44 in this exemplary embodiment assumes the malfunction occurring in the real user device 10 with reference to the various pieces of log information acquired from the real user device 10. For example, if a lower reception sensitivity at the access point 20 is detected by analyzing the log information, the simulation execution controller 44 assumes that the malfunction occurring in the real user device 10 is attributed to the wireless communication between the real user device 10 and the wireless communication apparatus present in the user environment 2. In this case, the simulation execution controller 44 of the virtual device 40 issues an instruction to the wireless router 130. The operation controller 131 of the wireless router 130 changes the Wi-Fi field intensity in accordance with the instruction from the virtual device 40.

For example, the operation controller 131 operates the wireless router 130 to lower the field intensity. Alternatively, noise may be generated around the real support device 110 in such a manner that an instruction to wireless equipment (not illustrated) is issued in the support hub 6.

As described above, if the malfunction assumed by analyzing the various pieces of log information is attributed to the cooperative operation between the real user device 10 and the different apparatus present in the user environment 2, the virtual device 40 controls the operation of the apparatus that is installed in the support hub 6 and that is equivalent to the different apparatus. According to the example above, for example, if the malfunction occurring in the real user device 10 is attributed to the cooperative operation with the wireless communication apparatus serving as the different apparatus, such as a smartphone, the simulation execution controller 44 controls the operation of not only the real support device 110 but also the wireless router 130 having a wireless communication function equivalently like the wireless communication apparatus in the user environment 2.

The wireless router 130 is herein taken as an example; however, the example does not have to be limited to the wireless router 130. For example, the simulation execution controller 44 may issue an operation instruction to the server 120 for the simulation. In accordance with the instruction from the virtual device 40, the operation controller 121 of the server 120 causes the server 120 to operate not to reply to the transmission request from the real support device 110.

As described above, the simulation execution controller 44 in this exemplary embodiment controls the execution of the simulation by also controlling the operation of the apparatus that is the apparatus present in the support hub 6 and that is equivalent to the different apparatus present in the user environment 2. The other steps may be the same as those in Exemplary Embodiment 1.

According to this exemplary embodiment, even if the occurrence of a malfunction is attributed to the cooperation between the real user device 10 and the different apparatus, the malfunction may be reproduced.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus reproduces a malfunction occurring in a different information processing apparatus, the malfunction being reproduced outside an environment where the different information processing apparatus is installed. The information processing apparatus includes:

a processor configured to:

in response to occurrence of a malfunction in the different information processing apparatus, acquire apparatus state information from the different information processing apparatus, the apparatus state information being used for malfunction analysis; and with reference to the acquired apparatus state information, create an operating environment in a system provided outside the environment where the different information processing apparatus is installed, the operating environment being equivalent to an operating environment of the different information processing apparatus.

(((2)))

In the information processing apparatus according to (((1))), the processor is configured to:

cause an information processing apparatus installed in the system, to be configured as an equivalent information processing apparatus equivalent to the different information processing apparatus by transmitting the acquired apparatus state information to the system.

(((3)))

In the information processing apparatus according to (((2))), the processor is configured to:

in response to the system not configuring the equivalent information processing apparatus successfully, configure the information processing apparatus for not configured part to enable the malfunction to be reproduced in the information processing apparatus; and reproduce the malfunction with an environment for reproduction created in the information processing apparatus being linked to an environment for the reproduction in the system.

(((4)))

In the information processing apparatus according to (((1))), the processor is configured to:

with reference to the acquired apparatus state information, assume the malfunction occurring in the different information processing apparatus; and control operation in the system to reproduce the assumed malfunction.

(((5)))

In the information processing apparatus according to (((4))), the processor is configured to:

in response to the assumed malfunction being attributed to cooperative operation between the different information processing apparatus and a different apparatus, control operation of an apparatus that is installed in the system and that is equivalent to the different apparatus.

(((6)))

In the information processing apparatus according to (((1))), the information processing apparatus is formed in a cloud site.

(((7)))

A simulation system includes:

the information processing apparatus according to (((1))); and an information processing apparatus for reproducing the malfunction installed in the system provided outside the environment where the different information processing apparatus is installed.

(((8)))

A program causes a computer that reproduces a malfunction occurring in a different computer to implement, the malfunction being reproduced outside an environment where the different computer is installed:

in response to occurrence of a malfunction in the different computer, acquiring apparatus state information from the different computer, the apparatus state information being used for malfunction analysis; and with reference to the acquired apparatus state information, creating an operating environment in a system provided outside the environment where the different computer is installed, the operating environment being equivalent to an operating environment of the different computer.

What is claimed is:

1. An information processing apparatus that reproduces a malfunction occurring in a different information processing apparatus, the malfunction being reproduced outside an environment where the different information processing apparatus is installed, the information processing apparatus comprising:

a processor configured to:

in response to occurrence of a malfunction in the different information processing apparatus, acquire apparatus state information from the different information processing apparatus, the apparatus state information being used for malfunction analysis;

with reference to the acquired apparatus state information, create an operating environment in a system provided outside the environment where the different information processing apparatus is installed, the operating environment being equivalent to an operating environment of the different information processing apparatus;

cause an information processing apparatus installed in the system, to be configured as an equivalent information processing apparatus equivalent to the different information processing apparatus by transmitting the acquired apparatus state information to the system;

in response to the system not configuring the equivalent information processing apparatus successfully, configure the information processing apparatus for not configured part to enable the malfunction to be reproduced in the information processing apparatus; and reproduce the malfunction with an environment for reproduction created in the information processing apparatus being linked to an environment for the reproduction in the system.

2. The information processing apparatus according to claim 1, wherein the processor is configured to:

with reference to the acquired apparatus state information, assume the malfunction occurring in the different information processing apparatus; and control operation in the system to reproduce the assumed malfunction.

3. The information processing apparatus according to claim 2, wherein the processor is configured to:

in response to the assumed malfunction being attributed to cooperative operation between the different information processing apparatus and a different apparatus, control operation of an apparatus that is installed in the system and that is equivalent to the different apparatus.

4. The information processing apparatus according to claim 1, wherein the information processing apparatus is formed in a cloud site.

5. A simulation system comprising:

the information processing apparatus according to claim 1; and an information processing apparatus for reproducing the malfunction installed in the system provided outside the environment where the different information processing apparatus is installed.

6. A non-transitory computer readable medium storing a program causing a computer that reproduces a malfunction occurring in a different computer to implement, the malfunction being reproduced outside an environment where the different computer is installed:

in response to occurrence of a malfunction in the different computer, acquiring apparatus state information from the different computer, the apparatus state information being used for malfunction analysis;

with reference to the acquired apparatus state information, creating an operating environment in a system provided outside the environment where the different computer is installed, the operating environment being equivalent to an operating environment of the different computer;

causing an information processing apparatus installed in the system, to be configured as an equivalent information processing apparatus equivalent to the different information processing apparatus by transmitting the acquired apparatus state information to the system;

in response to the system not configuring the equivalent information processing apparatus successfully, configuring the information processing apparatus for not configured part to enable the malfunction to be reproduced in the information processing apparatus; and reproducing the malfunction with an environment for reproduction created in the information processing apparatus being linked to an environment for the reproduction in the system.

7. An information processing method performed by a computer that reproduces a malfunction occurring in a different computer, the malfunction being reproduced outside an environment where the different computer is installed, the method comprising:

in response to occurrence of a malfunction in the different computer, acquiring apparatus state information from the different computer, the apparatus state information being used for malfunction analysis;

with reference to the acquired apparatus state information, creating an operating environment in a system provided outside the environment where the different computer is installed, the operating environment being equivalent to an operating environment of the different computer;

causing an information processing apparatus installed in the system, to be configured as an equivalent information processing apparatus equivalent to the different information processing apparatus by transmitting the acquired apparatus state information to the system;

in response to the system not configuring the equivalent information processing apparatus successfully, configuring the information processing apparatus for not configured part to enable the malfunction to be reproduced in the information processing apparatus; and reproducing the malfunction with an environment for reproduction created in the information processing apparatus being linked to an environment for the reproduction in the system.

* * * * *